United States Patent [19]

Sato et al.

[11] 4,390,895
[45] Jun. 28, 1983

[54] COLOR IMAGE PICK-UP APPARATUS

[75] Inventors: Itsuzo Sato, Chigasaki; Kazushige Ooi, Sagamihara; Kikuo Saito, Yokohama; Yasuo Takemura, Tokyo; Toshihiro Shinohara, Yokohama, all of Japan

[73] Assignee: Tokyo Shibaura Denki Kabushiki Kaisha, Kanagawa, Japan

[21] Appl. No.: 301,440

[22] Filed: Sep. 11, 1981

[30] Foreign Application Priority Data

Oct. 7, 1980 [JP] Japan .................................. 55-139369

[51] Int. Cl.³ .............................................. H04N 9/04
[52] U.S. Cl. ....................................................... 358/44
[58] Field of Search ......................... 358/41, 37, 40, 44

[56] References Cited

U.S. PATENT DOCUMENTS 4,339,771 7/1982 Morishita et al. ................. 358/44 X

FOREIGN PATENT DOCUMENTS 54-116837 9/1979 Japan ..................................... 358/44

OTHER PUBLICATIONS

I.E.E.E. Transactions on Electron Devices vol. ED-25, No. 2, Feb. 1978.

Primary Examiner—Robert L. Richardson
Attorney, Agent, or Firm—Cushman, Darby & Cushman

[57] ABSTRACT

A color image pick-up apparatus using a single planar array of solid state light-sensitive elements with a color mosaic filter. The color mosaic filter is made up of three types of elements occurring in repeating patterns which are such that luminance-type elements occur at every other element portion along both of two orthogonal direction. The signal corresponding to luminance is separated from the output signal of the solid state light-sensitive elements and delayed for one horizontal scanning period. The high frequency component of the delayed signal is extracted. The extracted high frequency component signal is added to the signal corresponding to luminance which is succeedingly produced from the solid state light-sensitive elements.

9 Claims, 13 Drawing Figures

FIG. 2
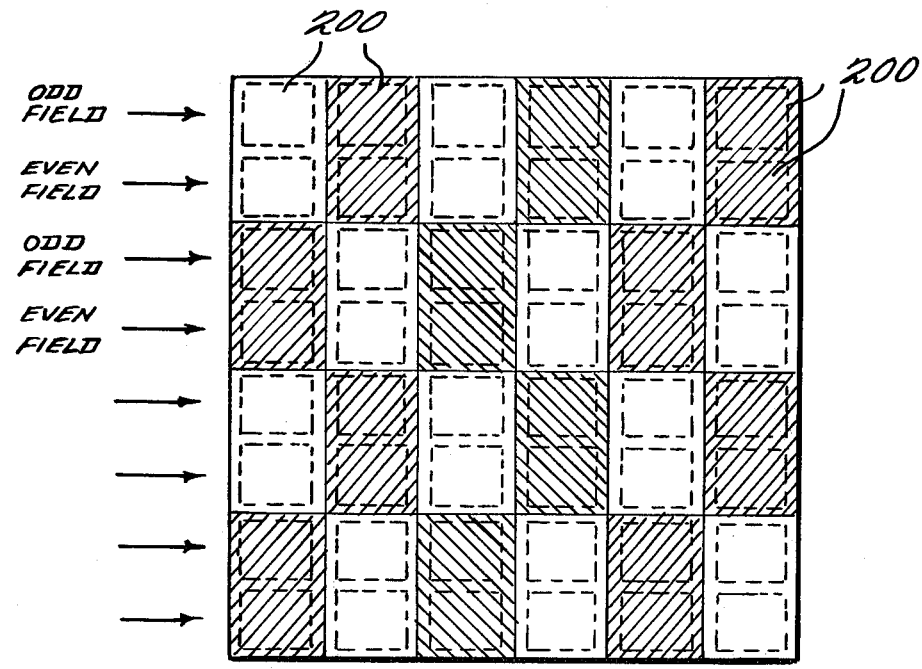
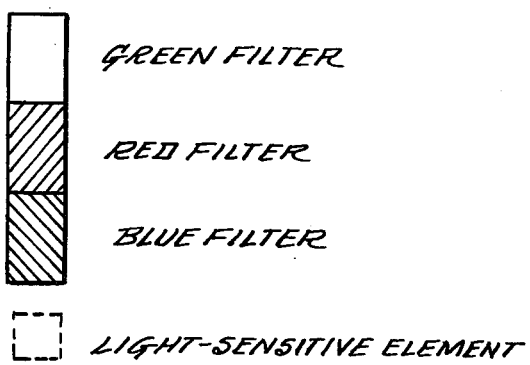
GREEN FILTER
RED FILTER
BLUE FILTER
LIGHT-SENSITIVE ELEMENT F I G. 3A
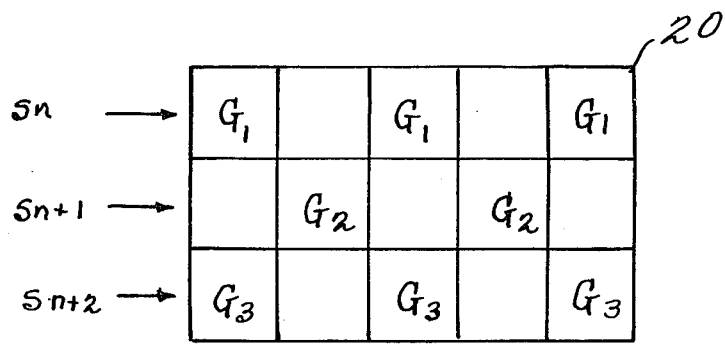
F I G. 3B
F I G. 4A
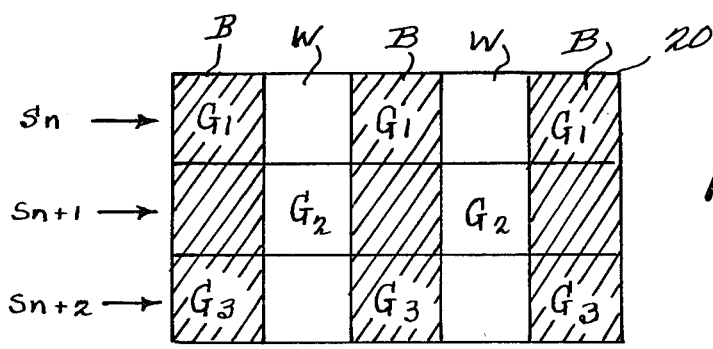
F I G. 4B

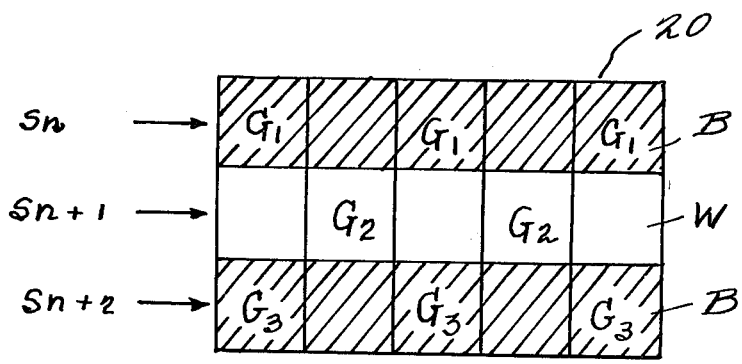

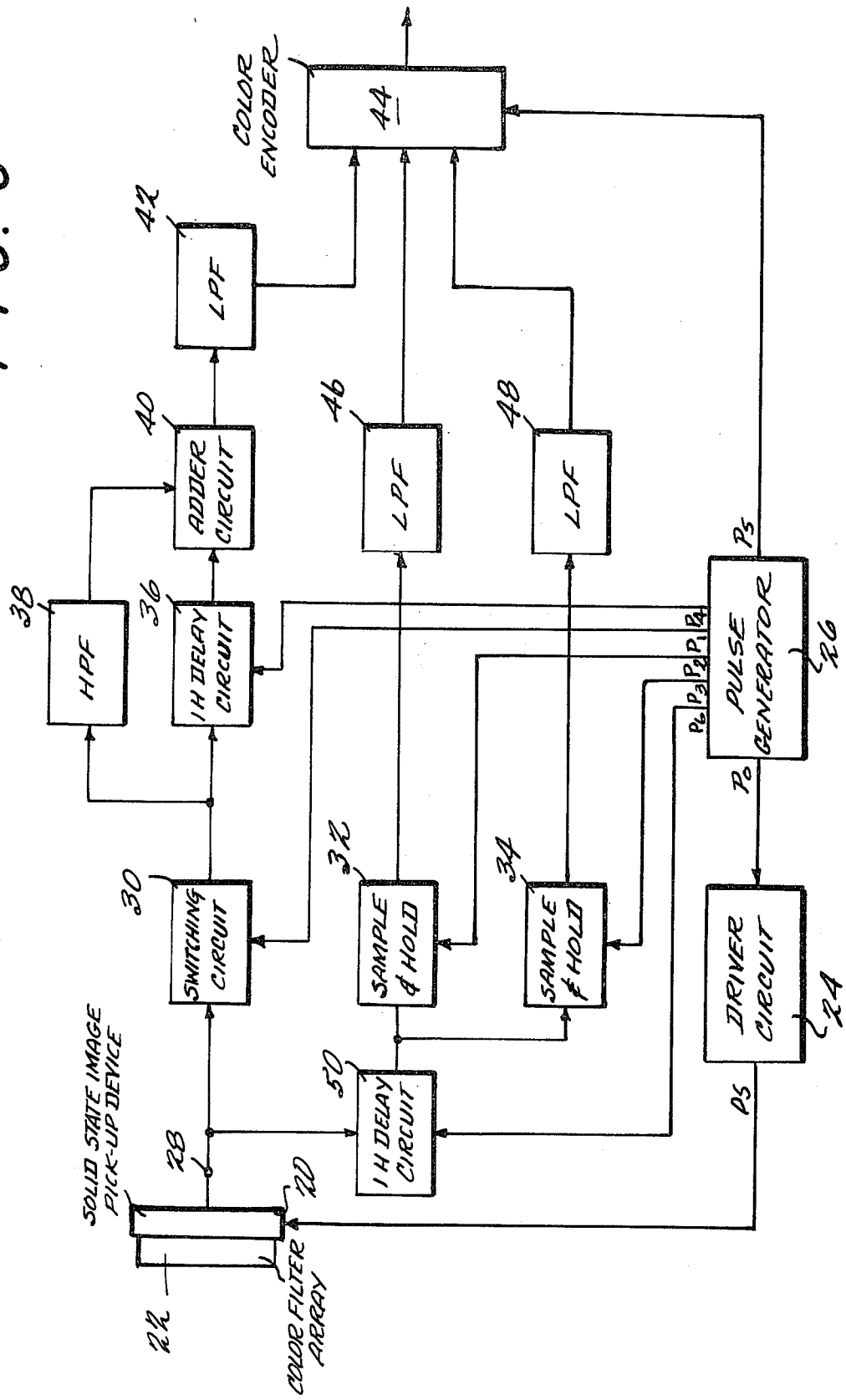

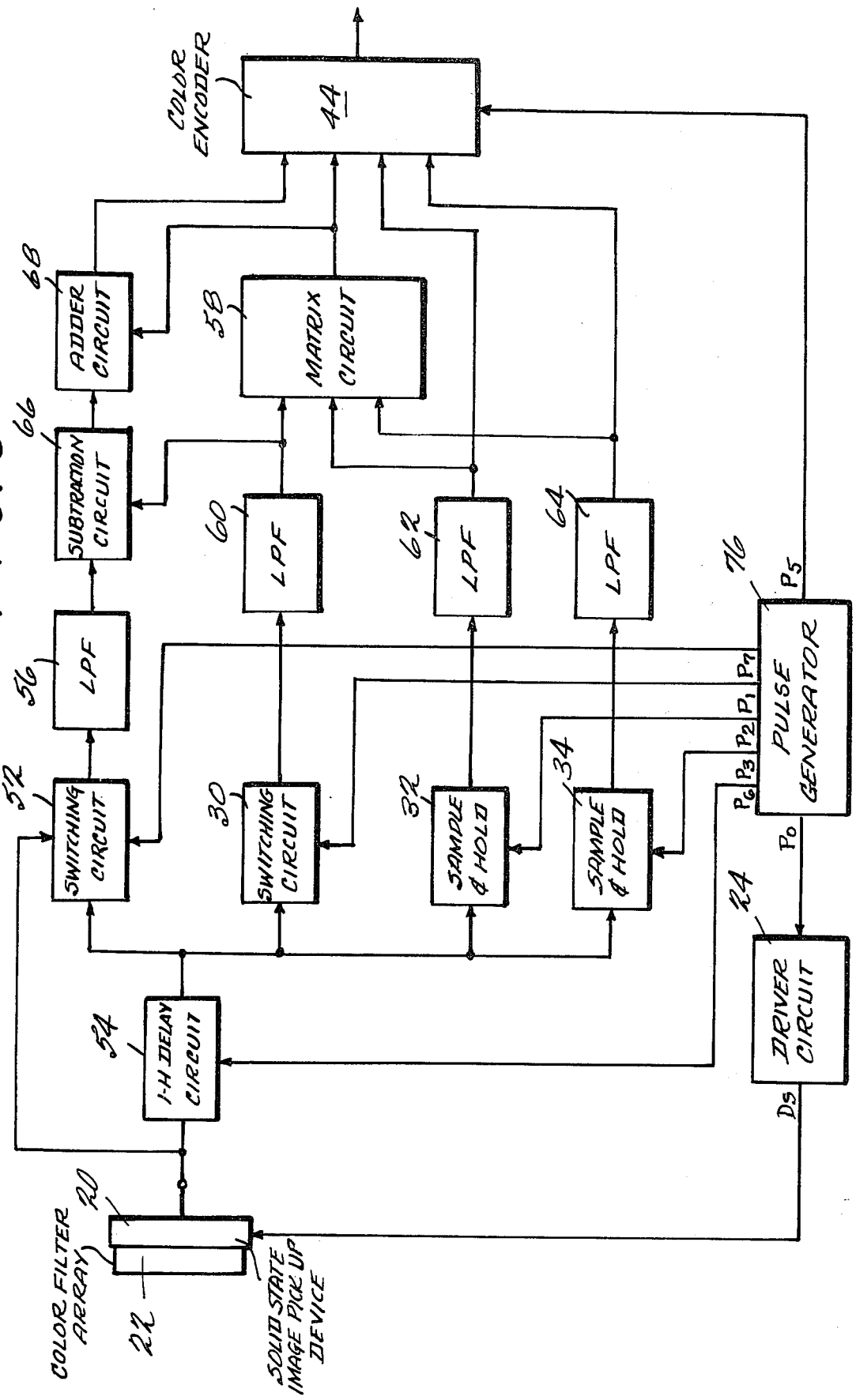

FIG. 10

| TRANSPARENT | | | BLUE |
|---|---|---|---|
| T | R | T | B |
| R | T | B | T |
| T | R | T | B |
| R | T | B | T |

RED →

COLOR IMAGE PICK-UP APPARATUS

BACKGROUND OF THE INVENTION

This invention relates to color image pick-up apparatus using solid-state image pick-up devices such as charge coupled devices (hereinafter CCD), and more particularly, to color video cameras using a single planar array of solid state, light-sensitive elements.

Recently, various image pick-up apparatus have been developed for a color television system using semiconductor devices such as CCD or bucket brigade devices (BBD). Particularly, a color imaging system employing a single planar CCD sensor with a color filter array has been proposed as a home use video camera. However, with the present technical level, it is difficult to manufacture a CCD sensor having a large number of picture elements, and as a result, CCD color image systems have a resolution capability well below that of a standard video display.

One method for improving the resolution is by employing a mosaic filter such as "Bater geometry" or "Interline geometry" filter array as shown in, for example, a paper entitled "Color Imaging System Using a Single CCD Area Array" by Peter L. P. Dillon et al., *IEEE Transactions On Electron Device*, Vol. ED-25, No. 2, February 1978. These mosaic filters allocate green filters more than red and blue filters in repeating patterns so as to pick up much green component signal, which component determines resolution.

Further, it is known in color image systems to use such a mosaic filter that green component signals produced from the picture elements of the CCD are delayed for one horizontal scanning period and added to green component signals successively produced from the picture elements of the CCD.

Such system has higher horizontal resolution. However, in this system the adjacent two horizontal lines are added to each other and the number of effective scanning lines equivalently decreases to nearly half of the actual number of scanning lines. As a result the vertical resolution is lowered.

SUMMARY OF THE INVENTION

It is an object of this invention to provide a color image pick-up apparatus using a single planar array of solid state light-sensitive elements, which array has excellent horizontal and vertical resolution.

In accordance with the preferred embodiment of this invention, the color image pick-up apparatus includes a single planar array of solid state light-sensitive elements and a color mosaic filter. The color mosaic filter is made up of three types of elements occurring in repeating patterns which are such that a luminance-type element occurs at every other element portion along both of two orthogonal direction. The signal corresponding to luminance is separated from the output signal produced by the solid state light-sensitive elements and delayed for one horizontal scanning period. The high frequency component of the delayed signal is extracted. The extracted high frequency component signal is supplemented to the signal corresponding to luminance which is succeedingly produced from the solid state light-sensitive elements.

BRIEF DESCRIPTION OF THE DRAWINGS

Other objects and advantages of this invention will become more apparent and more readily appreciated from the following detailed description of the presently preferred exemplary embodiments of the invention taken in conjunction with the accompanying drawings, in which

FIG. 2 is an illustration of a color filter array used in the embodiment shown in FIG. 1;

FIGS. 3A to 5B are illustrations used for explaining the operation of the color image pick-up apparatus shown in FIG. 1;

FIG. 6 is a schematic block diagram of another embodiment of a color image pick-up apparatus according to the present invention;

FIG. 7 is an illustration used for explaining the operation of the color image pick-up apparatus shown in FIG. 6;

FIG. 8 is a schematic block diagram of yet another embodiment of a color image pick-up apparatus according to the present invention;

FIG. 10 is an illustration of another exemplary color filter array used in this invention.

DESCRIPTION OF THE PREFERRED EMBODIMENTS

Figure 1:
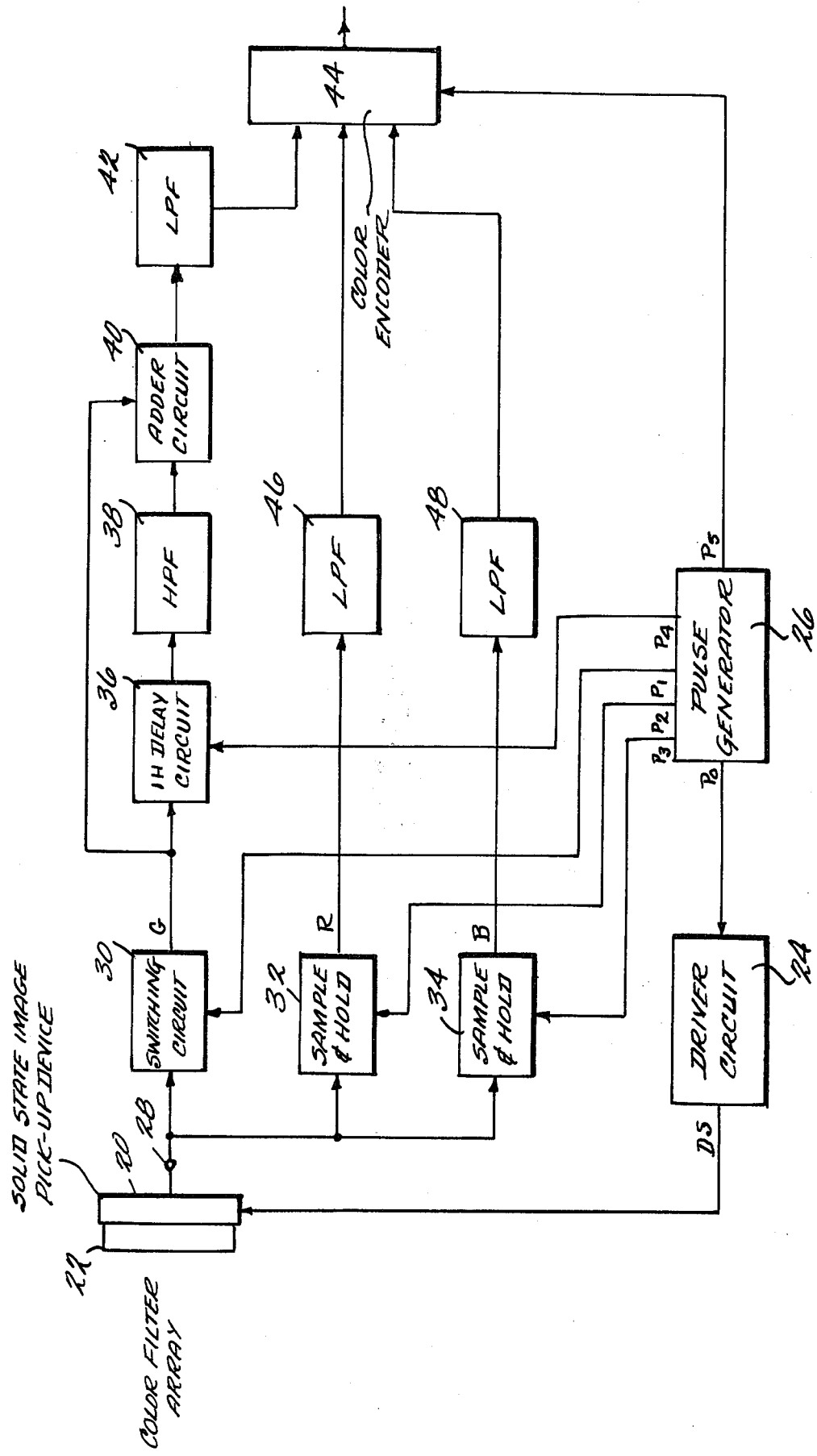
FIG. 1 is a schematic block diagram of one embodiment of a color image pick-up apparatus according to the present invention.

Referring now to FIG. 1, one embodiment of the present invention includes a solid state image pick-up device 20, for example, CCD, which is a substantially single planar array of solid state light-sensitive element, and a color filter array 22 superposed in one-to-one registry on the light-sensitive elements of image pick-up device 20.

Color filter array 22 is a mosaic filter made up of individual filter elements, e.g., green (G), red (R) and blue (B) filters. Such filter elements are arranged in repeating patterns of high-sensitive elements 200 as shown in FIG. 2 with green (G) filters occurring at every other element position in two perpendicular directions.

If an interlace scanning system is employed, one pitch of the color filter corresponds to two picture elements, i.e., one pitch corresponds with one of the light-sensitive elements 200 in a vertical direction and one pitch of the color filter corresponds with one picture element in the horizontal direction. The upper of each pair of picture elements 200 under each filter element are driven in the odd field scanning, and the lower are driven in the even field scanning.

Referring back to FIG. 1, solid state image pick-up device 20 is connected to a driver circuit 24. Driver circuit 24 supplies a driving signal DS to solid state image pick-up device 20 in response to a pulse signal $P_o$ generated from a pulse generator 26. Solid state image pick-up device 20 produces an electrical video signal in response to incident light. The output video signal is transmitted to switching circuit 30 and sample-and-hold circuits 32 and 34 through an output terminal 28 of solid state image pick-up device 20.

Switching circuits 30 and sample-and-hold circuits 32 and 34 respond to pulse signals $P_1$, $P_2$ and $P_3$ generated from pulse generator 26 and extract green (G), red (R) and blue (B) component signals from the output signal of solid state image pick-up device 20, respectively.

The green component signal (G) from switching circuit 30 is delivered to a one horizontal scanning period delay circuit (hereinafter 1H delay circuit) 36, for example, a CCD delay circuit which delays the signal one horizontal scanning period. The delayed signal is delivered to a high-pass filter 38 to pass the high frequency component signal GH of the green component signal. The high frequency component signal GH is supplied to an adder circuit 40 together with the output of switching circuit 30.

Adder circuit 40 adds the high frequency component GH of the green component signal delayed for one horizontal scanning period to the green component signal G produced by switching circuit 30. The output signal of adder circuit 40 is delivered to a low-pass filter 42 with the high frequency band, for example, 3.58 MHz which removes a clock noise and a switching noise from the output signal of adder circuit 40. The clock noise is produced in driving solid state image pick-up apparatus 20 and the switching noise is produced in switching circuit 30. The output signal of low-pass filter 42 is delivered to a color encoder 44.

The red (R) and blue (B) component signals extracted by sample-and-hold circuits 32 and 34 are held for two picture elements scanning period, and are delivered to color coder 44 through low-pass filters 46 and 48 which remove the clock and switching noises from the red and blue component signals, respectively. Color encoder 44 produces an NTSC color signal by composing the green, red and blue component signals in response to a clock pulse from clock generator 26.

The operation of the color image pick-up apparatus shown in FIG. 1 will be described referring to FIGS. 3A to 5B.

When solid state image pick-up device 20 with color filter array 22 shown in FIG. 2 is driven by driver circuit 24, color signals responding to the arrangement of the color filters are produced from solid state image pick-up device 20. The color signals thus produced are separated into each color signal, that is, green component signal (G), red component signal (R) and blue component signal (B) by switching circuits 20 and sample-and-hold circuits 32 and 34. FIG. 3A shows the separated green component signal. The green component signal $G_1$ according to the scanning line $S_n$ is delayed for one horizontal scanning period by 1H delay circuit 36 and its high frequency component $G_{1H}$ is extracted from the green component signal by high-pass filter 38. The high frequency component thus obtained is added to the green component signal $G_2$ according to the scanning line $S_{n+1}$. The green component signal $G_2$ is delayed for one horizontal scanning period and its high frequency component $G_{2H}$ is extracted therefrom, and then it is added to the green component signal $G_3$ according to the scanning line $S_{n+2}$. Accordingly, the output signal waveform of adder circuit 40 is shown in FIG. 3B.

The resolution of the color image pick-up apparatus depends on the number of picture elements, that is, the sampling number of signal corresponding to luminance, i.e. green component signal. Particularly, the horizontal resolution depends on the high frequency component of the green component signal and the vertical resolution depends on the low frequency component of the green component signal.

Accordingly, the horizontal resolution of the color image pick-up apparatus according to the present invention is improved because the green component signal is supplemented by 1H delayed high frequency green component signal.

FIG. 4A shows the incident pattern on the solid state image pick-up device 20. This pattern is vertical stripes of black (B) and white (W) and high horizontal resolution is required to reproduce such a pattern accurately. In accordance with the invention, the high frequency green component signal obtained before one horizontal scanning period is supplemented by the green component signal now obtained from the solid state image pick-up device 20. Accordingly, the green component signal increases as shown FIG. 4B and the horizontal resolution is improved.

Improving the vertical resolution of the color image pick-up apparatus depends on the low frequency component of the green component signal. Therefore, even if the green component signal is supplemented by the high frequency green component signal, it does no harm to vertical resolution.

FIG. 5A shows the incident pattern on the solid state image pick-up device 20. This pattern is lateral stripes of black (B) and white (W) and high vertical resolution is required to reproduce such a pattern accurately. In accordance with the prior art system, the 1H delayed signal, that is, the black color signal is added to the signal now produced from solid state image pick-up signal, that is, the white color signal. As a result, a gray color signal is produced.

In accordance with this invention, as only the high frequency of the 1H delayed signal is added to the signal now produced from solid state image pick-up apparatus, the vertical resolution is not affected. Accordingly, the white and black stripes are reproduced with high resolution. In the system of the present invention, the signals of the adjacent two scanning lines are not added with respect to the vertical direction. As a result, the vertical resolution is improved in comparison with the prior art. Thus, the color image pick-up apparatus according to the present invention has not only excellent horizontal resolution but also excellent vertical resolution.

As an alternative to the embodiment shown in FIG. 1, 1H delay circuit 36 may be provided between high pass filter 38 and adder circuit 40.

FIG. 6 illustrates another embodiment of the present invention similar to that illustrated in FIG. 1 except that only high-pass filter 38 is connected between switching circuit 30 and adder circuit 40 and a 1H delay circuit 50 the same as 1H delay circuit 36 is provided between solid state image pick-up device 20 and sample-and-hold circuits 32 and 34.

In operation, the green component signal from switching circuit 30 is delivered to 1H delay circuit 36 and high-pass filter 38. The output signals of 1H delay circuit 36 and high-pass filter 38 are delivered to adder circuit 40, and added to each other. Thus, in accordance with this embodiment, the high frequency of the green component signal now produced by solid state image pick-up apparatus 20 is supplemented to the 1H delayed green component signal as shown in FIG. 7. 1H delay circuit 50 delays the red and blue component signals to cause their phases to correspond with that of the green component signal from 1H delay circuit 36. As an alternative to providing 1H delay circuit between solid state image pick-up device 20 and sample-and-hold circuits 32 and 34, 1H delay delay circuits may be each provided between color coder 44 and sample-and-hold circuits 32 and 34.

FIG. 8 illustrates yet another embodiment of this invention. In FIG. 8, the output signal of solid state image pick-up device 20 is delivered to a switching circuit 52, switching circuit 30 and sample-and-hold circuits 32 and 34 through a 1H delay circuit 54. Further the output signal of solid state image pick-up device 20 is delivered to switching circuit 52. Switching circuit 52 alternatively extracts the green component signal from the output signals of solid state image pick-up device 20 and 1H delay circuit 54 in response to a control signal P7 from pulse generator 26. The output signal of switching circuit 52 is delivered to low-pass filter 56 to remove the switching noise, etc.

Switching circuit 30 and sample-and-hold circuits 32 and 34 extract green, red and blue signals from the output signal of 1H delay circuit 54. The output signals from switching circuit 30 and sample-and-hold circuits 32 and 34 are each delivered to a matrix circuit 58, which produces a low frequency luminance signal by adding at a predetermined rate green, red and blue component signals, through low-pass filters 30, 32 and 34. The frequency band of low-pass filter 56 is wide, for example, 3.2 MHz, enough to extract the high frequency component of the output signal from switching circuit 52. The frequency bands of low-pass filter 60, 62 and 64 are relatively narrow, for example, 500 KHz, according to the frequency band width of color signal.

The output signal of low-pass filter 56 is delivered to a subtraction circuit 66 together with the output signal of low-pass filter 60. Subtraction circuit 66 subtracts the output signal of low-pass filter 60 from the output signal of low-pass filter 56. As a result, subtraction circuit 66 produces the green component signal and the 1H delayed high frequency green component signal alternatively.

The output signal is delivered to an adder circuit 68 together with the output signal of matrix circuit 58. Adder circuit 68 adds the high frequency green component signal from subtraction circuit 66 and the low frequency luminance signal from matrix circuit 58 to produce a luminance signal which improves both horizontal and vertical resolution.

This output signal is delivered to color encoder 44 together with the output signals of matrix circuit 58 and low-pass filters 62 and 64. Color encoder 44 produces color video signal having excellent color reproduction.

Figure 9:
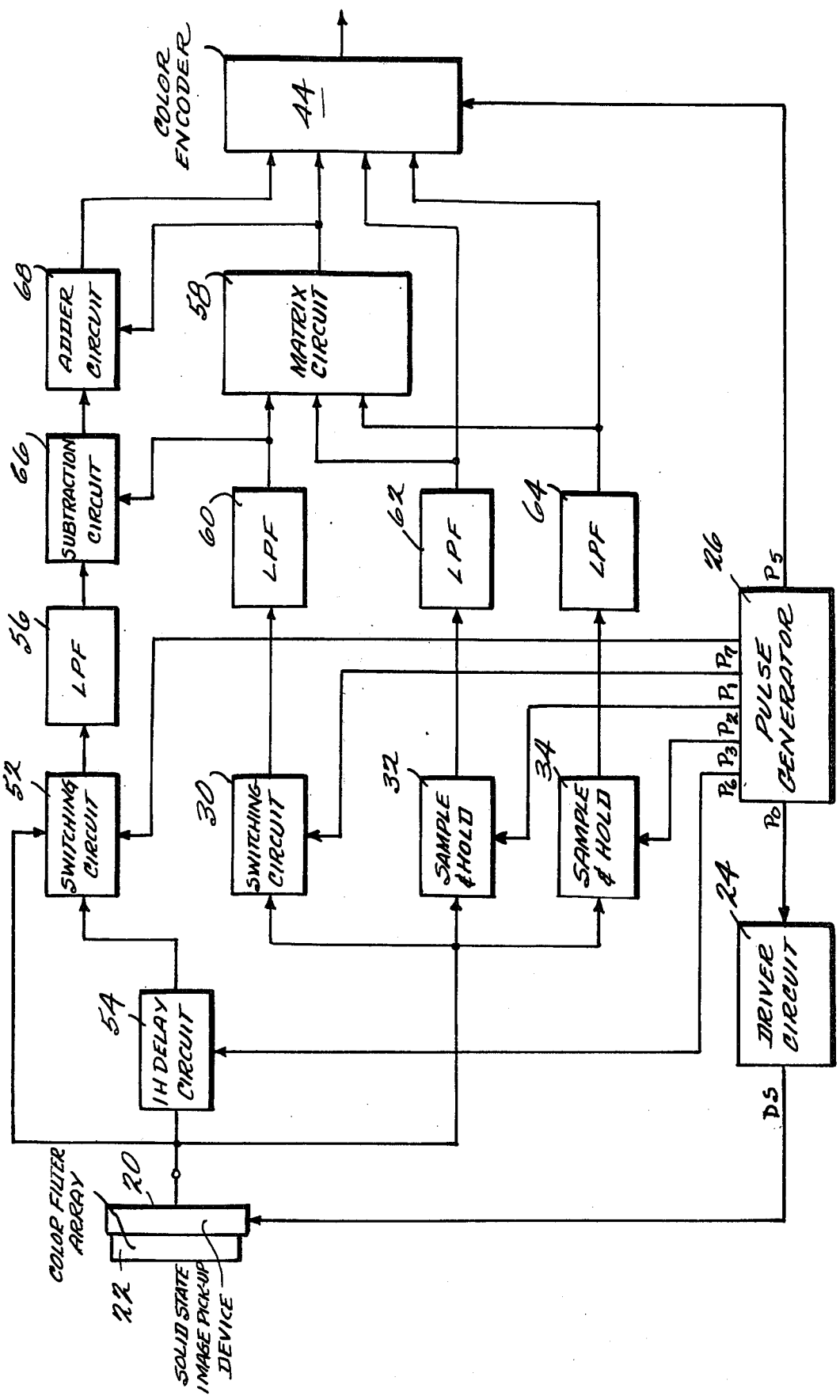
FIG. 9 is a schematic block diagram of a further embodiment of a color image pick-up apparatus according to the present invention.

FIG. 9 illustrates further embodiment of this invention similar to that illustrated in FIG. 8 except that only the output signal of solid state image pick-up device is directly delivered to switching circuit 30 and sample hold circuit 32 and 34 without passing through 1H delay circuit 54 and the high frequency green component signal is extracted by a high-pass filter 70 connected between low-pass filter 56 and adder circuit 68.

In accordance with this embodiment, 1H delay circuit 54 does not have to deliver the low frequency component of the video signal from solid state image pick-up apparatus and a glass delay line may be employed as the 1H delay circuit. As a result, the color image pick-up apparatus is constructed simply.

As an alternative the series circuit of low-pass filter 56 and high-pass filter 70 in FIG. 9, a band pass filter may be provided.

Figure 10:
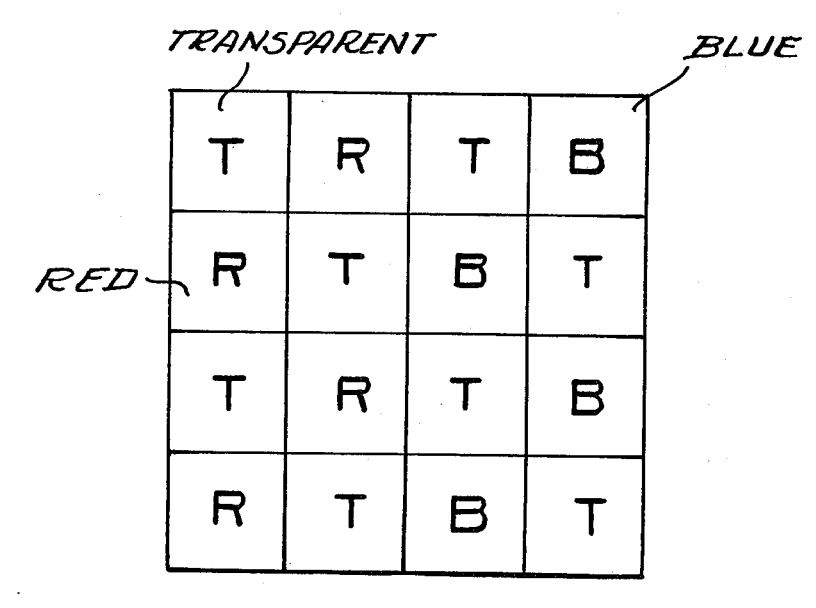

The color filter array is not limited to the embodiment shown in FIG. 2, but may employ "Bayer geometry" filter arrays and the like. Further, green filters of the color filter array may be replaced by filters corresponding to luminance, for example, transparent filters shown in FIG. 10.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. A color image pick-up apparatus comprising:
   a substantially planar array of solid state light-sensitive elements;
   a filter mosaic made up of individual filter elements which are superposed in one-to-one registry on said light-sensitive elements, said mosaic being comprised of a first type of element sensitive to a spectral region corresponding to luminance and associated with the color green, a second type of element sensitive to one spectral region corresponding to chrominance and associated with the color red, and third type of element sensitive to a different spectral region corresponding to chrominance and associated with the color blue, the three types of elements occurring in repeating patterns which are such that over at least a major portion of said array luminance-type elements occur at every other element position along both of two orthogonal directions of said array;
   separating means for separating said signals associated with red, green, and blue from the output signal of said solid state image pick-up device;
   extracting means for extracting a high frequency component from said signal corresponding to luminance and associated with green;
   means for adding said high frequency component signal corresponding to luminance and associated with green to the signal corresponding to luminance produced from the adjacent horizontal element of said solid state light-sensitive element; and
   color encoder means, connected to said separating means and adding means, for producing color video signals from the signals corresponding to said luminance and chrominance.

2. A color image pick-up apparatus according to claim 1, wherein said luminance-type elements of the filter mosaic are transparent filters.

3. A color image pick-up apparatus according to claim 1, wherein said adding means comprises:
   a delay circuit, connected between said separating means and said extracting means, for delaying the signal from said separating means for one horizontal scanning period.

4. A color image pick-up apparatus according to claim 1, wherein said adding means comprises:
   a delay circuit, connected to said extracting means, for delaying the signal from said extracting means for one horizontal scanning period, and
   adder circuit, connected to said delay circuit and said separating means, for adding the output signal of said delay circuit to the output signal of said separating means.

5. A color image pick-up apparatus according to claim 1, wherein said adding means comprises:

a delay circuit, connected to said separating means, for delaying the signal from said separating means one horizontal scanning period, and adder circuit, connected to said extracting means and said delay circuit, for adding the output signal of said exacting means to the output signal of said delay circuit.

6. A color image pick-up apparatus comprising:

a substantially planar array of solid state light-sensitive elements;

a filter mosaic made of individual filter elements which are superposed in one-to-one registry on said light-sensitive elements, said mosaic being comprised of a first type of filter element sensitive to a spectral region corresponding to luminance and associated with the color green, a second type of element sensitive to one spectral region corresponding to chrominance and associated with the color red, and third type of element sensitive to a different spectral region corresponding to chrominance and associated with the color blue, the three types of elements occurring in repeating patterns which are such that over at least a major portion of said array luminance-type elements occur at every other element portion along both of two orthogonal directions of said array;

means for delaying the output signal of said solid state light-sensitive elements for one horizontal scanning period;

first separating means, connected to the output and input of said delaying means, for separating said signals corresponding to luminance alternatively from the input signal and from the output signal of said delaying means;

second separating means for separating said signals associated with red green and blue from the output signal of said solid state light-sensitive element;

extracting means for extracting a low frequency component from the signal corresponding to luminance and associated with green separated by said second separating means;

subtracting means for subtracting the output signal of said extracting means from the output signal of said first separating means; and color encoder for producing color video signal from the signals from said subtracting means and said second separating means.

7. A color image pick-up apparatus according to claim 6, wherein said second separating means is connected to the output terminal of said delaying means.

8. A color image pick-up apparatus according to claim 6, further comprises:

means for extracting low frequency components from the signals corresponding to chrominance;

a matrix circuit, connected to said extracting means, for producing a luminance signal from said signals corresponding to luminance and chrominance; and an adder circuit for adding said luminance signal from said matrix circuit to the signal from said subtracting means.

9. A color image pick-up apparatus according to claim 6, wherein said luminance-type elements of the filter mosaic are sensitive in the green region of the spectrum, and the two types of chrominance elements are sensitive in the red and blue regions of the spectrum, respectively.

* * * * *